(12) United States Patent
Suzuki et al.

(10) Patent No.: US 11,058,989 B2
(45) Date of Patent: Jul. 13, 2021

(54) ACIDIC GAS ABSORBENT, ACIDIC GAS REMOVAL METHOD AND ACIDIC GAS REMOVAL APPARATUS

(71) Applicants: KABUSHIKI KAISHA TOSHIBA, Minato-ku (JP); TOSHIBA ENERGY SYSTEMS & SOLUTIONS CORPORATION, Kawasaki (JP)

(72) Inventors: Akiko Suzuki, Ota (JP); Yoshihiko Nakano, Yokohama (JP); Reiko Yoshimura, Kawasaki (JP); Toshihiro Imada, Kawasaki (JP); Takashi Kuboki, Ota (JP); Kenji Sano, Inagi (JP); Mitsuru Udatsu, Kawasaki (JP)

(73) Assignees: KABUSHIKI KAISHA TOSHIBA, Minato-ku (JP); TOSHIBA ENERGY SYSTEMS & SOLUTIONS CORPORATION, Kawasaki (JP)

(*) Notice: Subject to any disclaimer, the term of this patent is extended or adjusted under 35 U.S.C. 154(b) by 0 days.

(21) Appl. No.: 16/297,163

(22) Filed: Mar. 8, 2019

(65) Prior Publication Data

US 2020/0086266 A1    Mar. 19, 2020

(30) Foreign Application Priority Data

Sep. 18, 2018 (JP) ............................. JP2018-173955

(51) Int. Cl.
*B01D 53/14* (2006.01)
*B01D 53/62* (2006.01)
(Continued)

(52) U.S. Cl.
CPC ..... *B01D 53/1475* (2013.01); *B01D 53/1425* (2013.01); *B01D 53/18* (2013.01);
(Continued)

(58) Field of Classification Search
None
See application file for complete search history.

(56) References Cited

U.S. PATENT DOCUMENTS 6,277,345 B1  8/2001  Stankowiak et al.
8,506,913 B2  8/2013  Murai et al.
(Continued)

FOREIGN PATENT DOCUMENTS

JP   2010-155753 A   7/2010
JP   2012-143744 A   8/2012
(Continued)

OTHER PUBLICATIONS

Sigma-Aldrich Co., "Safety Data Sheet for N-Methyldiethanolamine." Published on Sep. 28, 2019; viewed on Jan. 15, 2020 at https://www.sigmaaldrich.com/catalog/substance/nmethyldiethanolamine1191610559911?lang=en&region=US.*
(Continued)

*Primary Examiner* — Daniel Berns
(74) *Attorney, Agent, or Firm* — Oblon, McClelland, Maier & Neustadt, L.L.P.

(57) ABSTRACT

The embodiments provide an acidic gas absorbent having low diffusibility, an acidic gas removal method, and an acidic gas removal apparatus. The acidic gas absorbent according to the embodiment comprises: an amine compound having a vapor pressure of 0.001 to 10 Pa at 20° C.; a water-soluble polymer compound having a mass-average molecular weight of 900 to 200000 and not containing a functional group having a pKa value greater than 7 except for hydroxy; and water.

7 Claims, 1 Drawing Sheet

(51) Int. Cl.
B01D 53/78 (2006.01)
B01D 53/18 (2006.01)

(52) U.S. Cl.
CPC ............ B01D 53/62 (2013.01); B01D 53/78 (2013.01); *B01D 2252/205* (2013.01); *B01D 2252/20405* (2013.01); *B01D 2252/20431* (2013.01); *B01D 2252/20489* (2013.01); *B01D 2252/504* (2013.01); *B01D 2257/504* (2013.01)

(56) References Cited

U.S. PATENT DOCUMENTS

| | | | |
|---|---|---|---|
| 8,545,783 | B2 | 10/2013 | Murai et al. |
| 9,399,192 | B2 | 7/2016 | Fujimoto et al. |
| 9,409,119 | B2 | 8/2016 | Murai et al. |
| 9,446,346 | B2 | 9/2016 | Murai et al. |
| 9,724,642 | B2 | 8/2017 | Murai et al. |
| 10,046,269 | B2 | 8/2018 | Murai et al. |
| 2004/0132305 | A1* | 7/2004 | Nishimoto ............... C09G 1/02 438/690 |
| 2013/0140493 | A1* | 6/2013 | Mori ................. C23F 11/08 252/392 |
| 2013/0343974 | A1 | 12/2013 | Murai et al. |
| 2014/0241967 | A1 | 8/2014 | Fujita et al. |
| 2015/0044114 | A1 | 2/2015 | Murai et al. |
| 2015/0290580 | A1 | 10/2015 | Grandjean et al. |
| 2015/0321144 | A1 | 11/2015 | Grandjean et al. |
| 2017/0266607 | A1 | 9/2017 | Watando et al. |
| 2018/0272267 | A1 | 9/2018 | Kondo et al. |
| 2019/0083921 | A1 | 3/2019 | Suzuki et al. |
| 2019/0083922 | A1 | 3/2019 | Suzuki et al. |

FOREIGN PATENT DOCUMENTS

| | | |
|---|---|---|
| JP | 2012-245483 A | 12/2012 |
| JP | 5646892 B2 | 12/2014 |
| JP | 5659084 B2 | 1/2015 |
| JP | 5659127 B2 | 1/2015 |
| JP | 5659128 B2 | 1/2015 |
| JP | 2015-29987 A | 2/2015 |
| JP | 5688455 B2 | 3/2015 |
| JP | 2015-71136 A | 4/2015 |
| JP | 5701998 B2 | 4/2015 |
| JP | 5713997 B2 | 5/2015 |
| JP | 2015-107443 A | 6/2015 |
| JP | 2015-112574 A | 6/2015 |
| JP | 5738710 B2 | 6/2015 |
| JP | 2015-199007 A | 11/2015 |
| JP | 5868795 B2 | 2/2016 |
| JP | 2016-93793 A | 5/2016 |
| JP | 2016-198714 A | 12/2016 |
| JP | 2017-35669 A | 2/2017 |
| JP | 2017-121610 A | 7/2017 |
| JP | 6173817 B2 | 8/2017 |
| JP | 2017-164696 A | 9/2017 |
| JP | 2017-164697 A | 9/2017 |
| JP | 2017-196547 A | 11/2017 |
| JP | 2018-122278 A | 8/2018 |
| JP | 2018-158302 A | 10/2018 |
| JP | 2018-183729 A | 11/2018 |
| JP | 2019-55371 A | 4/2019 |
| JP | 2019-55394 A | 4/2019 |
| WO | WO 2014/010377 A1 | 1/2014 |

OTHER PUBLICATIONS

Lookchem.com, "Bis(2-dimethylaminoethoxy)ethane." Published 2008; viewed on Jan. 15, 2020 at https://www.lookchem.com/Bis-2-dimethylaminoethoxy-ethane/.*

Ljubica et al., "Structure Building in O/W Emulsions in Shear Induced by Surfactant-Nongeling Polymer Interactions." (Conference paper) 3rd International Symposium on Food Rheology and Structure, Sep. 2003.*

* cited by examiner

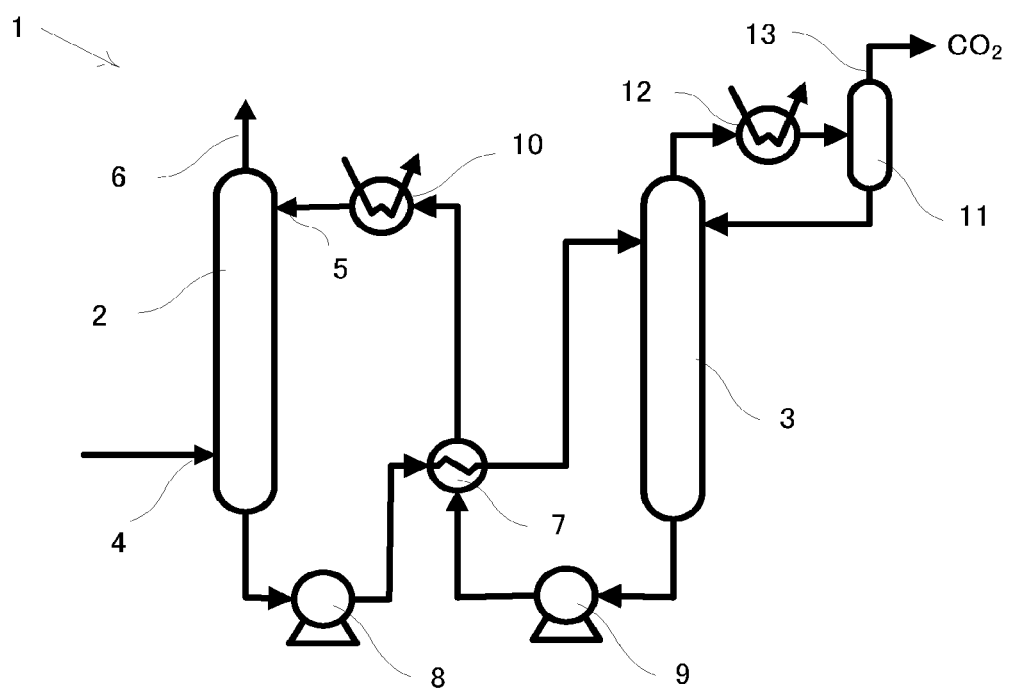

ACIDIC GAS ABSORBENT, ACIDIC GAS REMOVAL METHOD AND ACIDIC GAS REMOVAL APPARATUS

CROSS-REFERENCE TO RELATED APPLICATIONS

This application is based upon and claims the benefit of priority from the prior Japanese Patent Application No. 2018-173955, filed on Sep. 18, 2018 the entire contents of which are incorporated herein by reference.

FIELD

Embodiments of the present disclosure relate to an acidic gas absorbent, an acidic gas removal method and an acidic gas removal apparatus.

BACKGROUND

It has been recently pointed out that global warming is partly attributed to greenhouse effect caused by increase of carbon dioxide ($CO_2$) concentration, and it is urgent to take international measures to protect global environment. Carbon dioxide ($CO_2$) is largely generated by industrial activities, and there is an increasing momentum toward reduction of $CO_2$ emitted into the atmosphere. In particular, it is urgently necessary to reduce $CO_2$ emission from coal-fired power plants and factories. Further, it is also desired to reduce emission of acidic gases other than $CO_2$, such as hydrogen sulfide ($H_2S$).

In view of that, as means for reducing emission of acidic gases such as $CO_2$, much attention is paid to not only streamlining of thermal power plants or the like for emission reduction but also $CO_2$ recovery by use of chemical absorbents.

As practical chemical absorbents, amine compounds have been studied for a long time. However, it is known that, when adopted for $CO_2$ absorption and desorption process, the absorbents are often heated to regenerate and thereby amine compounds contained therein may be diffused into the atmosphere. If amine compounds are diffused into the atmosphere in great amounts, there is a fear of unfavorable influences on surrounding environments of the processing plant. Accordingly, the plant is generally provided with amine traps made of water or acids so as to prevent diffusion of amine compounds.

It is thus necessary to install amine traps, but even so the amine traps are not always able to fully prevent diffusion of the absorbents.

BRIEF DESCRIPTION OF THE DRAWINGS

FIG. 1 schematically shows an acidic gas removal apparatus according to the embodiment.

DETAILED DESCRIPTION

Embodiments will now be explained with reference to the accompanying drawings.

The acidic gas absorbent according to an embodiment of the present disclosure comprises:

an amine compound having a vapor pressure of 0.001 to 10 Pa at 20° C.;

a water-soluble polymer compound which has a mass-average molecular weight of 900 to 200000 and which does not contain a functional group having a pKa value greater than 7 except for hydroxy; and water.

Further, in the acidic gas removal method according to another embodiment of the present disclosure, a gas containing an acidic gas is brought into contact with the above acidic gas absorbent so as to remove the acidic gas from the acidic gas-containing gas.

Furthermore, the acidic gas removal apparatus according to still another embodiment of the present disclosure comprises:

an absorption unit in which a gas containing an acidic gas is brought into contact with the above acidic gas absorbent, so that the absorbent absorbs the acidic gas to remove it from the acidic gas-containing gas; and a regeneration unit in which the absorbent holding the acidic gas is made to desorb the acidic gas so as to be regenerated;

so that the absorbent regenerated in the regeneration unit is reused in the absorption unit.

The embodiments are described below in detail.

<Acidic Gas Absorbent>

In the following description, the embodiments will be explained mainly in case examples where the acidic gas is carbon dioxide ($CO_2$). However, the acidic gas absorbent according to the embodiment can give the same effect on other acidic gases such as hydrogen sulfide. Specifically, the absorbent of the embodiment is suitable to absorb oxidizing gases such as carbon dioxide and hydrogen sulfide. More specifically, the absorbent is particularly suitable for absorbing carbon dioxide and is advantageously employed in a system for recovering carbon dioxide from industrial exhaust fumes.

The acidic gas absorbent according to the embodiment contains an amine compound as a main agent for absorbing acidic gases. The amine compound can be selected from known ones generally adopted as acidic gas absorbents in consideration of the proper vapor pressure.

Examples of the usable amine compounds include primary amines, secondary amines, tertiary amines and quaternary ammoniums. In addition, polyamine compounds such as diamines and triamines are also employable. Further, it is still also possible to adopt derivatives in which hydrogens in the above amine compounds are replaced with substituents such as hydroxy or in which methylene groups in the amine compounds are replaced with oxy, carbonyl, sulfonyl or the like. Although amine compounds are water-soluble in general, it is preferred to use amines having high water-solubility.

Specifically, usable amine compounds are as follows:
(i) aminoalcohols,
(ii) cyclic amines,
(iii) primary amines,
(iv) secondary amines,
(v) tertiary amines,
(vi) polyamines,
(vii) polyalkylenepolyamines, and
(viii) amino acids.

Here, it should be noted that the above categories are only for the sake of convenience, and there are some amine compounds included in two or more of the above categories. For example, methyldiethanolamine is a kind of aminoalcohol and is also a kind of tertiary amine.

Among the above, it is preferred to adopt (i) aminoalcohols or (v) tertiary amines because they can prevent the compound from diffusing into air.

In the embodiment, an amine compound having a low vapor pressure is employed. Since the amine compound has a low vapor pressure, it can be realized to keep the diffusibility thereof at a low level. Specifically, the amine compound has a vapor pressure of 0.001 to 10 Pa, preferably 0.005 to 5 Pa, more preferably 0.01 to 1 Pa at 20° C. If an amine compound having a high vapor pressure is used in combination with the water-soluble polymer compound described later, the effect of the embodiment may be weakened.

Preferred examples of the amine compound satisfying the above vapor pressure condition include: methyldiethanolamine (vapor pressure at 20° C.: 0.03 Pa), diethanolamine (vapor pressure at 20° C.: 0.04 Pa), and ethyldiethanolamine (vapor pressure at 20° C.: 0.3 Pa).

The acidic gas absorbent is repeatedly used, and hence the compound preferably has high stability. In view of that, it is preferred not to adopt ammonia, methylamine or hydrazine.

The acidic gas absorbent according to the embodiment also contains a particular water-soluble polymer compound. The water-soluble polymer compound is used in combination with the above amine compound, and thereby the diffusibility is remarkably improved.

The water-soluble polymer compound in the embodiment has a mass-average molecular weight of 900 to 200000, preferably 1000 to 180000. The mass-average molecular weight is preferably large in view of improving the diffusibility but is preferably small in view of reducing the cost.

In order to ensure sufficient water-solubility, the water-soluble polymer compound contains a water-soluble group typified by hydroxy (—OH). Examples of other water-soluble groups include: oxy (—O—), carboxy (—COOH), carboxylato (—COO$^-$), sulfo (—SO$_3$H), and sulfonato (—SO$_3^-$). Here, acid groups such as carboxy and sulfo are combined with alkali metals and the like to form salts such as —COOM and —SO$_3$M (where M is a metal ion), but in the present embodiment they are regarded as carboxylato and sulfonato, respectively, for the sake of convenience. The polymer compound used in the embodiment preferably contains hydroxy, oxy, carboxy or carboxylato, and it is more preferred not to contain other functional groups.

The water-soluble polymer compound in the embodiment may contain other functional groups but does not contain functional groups having high pKa values. Specifically, the polymer compound contains functional groups which have pKa values of 7 or less or which do not dissociate and hence have no pKa values like oxy. That is because functional groups having high pKa values generally react with acidic gases to change chemical characteristics of the compound and/or properties of the acidic gas absorbent or to emit the acidic gases when the absorbent is regenerated. However, although having a pKa value greater than 7, hydroxy hardly causes those troubles and hence may be contained in the water-soluble polymer compound.

The pKa values of functional groups can be obtained by calculation. Specifically, the pKa values can be easily obtained by partial charge distribution calculation according to Calculator Plugins Protonation bundle ([trademark], manufactured by ChemAxon).

For the reasons described above, the water-soluble polymer compound in the embodiment absorbs acidic gases, particularly carbon dioxide, in a small amount. The amount of absorbed carbon dioxide can be determined, for example, by the steps of: introducing 100% CO$_2$ gas into an aqueous solution of the water-soluble polymer compound; measuring the quantitative $^{13}$C-NMR spectrum of the solution; and comparing the integrated values of signals attributed to CO$_2$ and the polymer compound with each other.

The water-soluble polymer compound used in the embodiment preferably absorbs carbon dioxide in such an amount that the value measured in the above manner is 0.01 mol or less per 1 mol of the polymer compound.

The water-soluble polymer compound is preferably a water-soluble vinyl polymer or a water-soluble polysaccharide. Examples of the water-soluble vinyl polymer include: carboxy vinyl polymer, alkali metal salts of carboxy vinyl polymer, polyvinyl alcohol, and polyvinylpyrrolidone. Here, the "carboxy vinyl polymer" includes polyacrylic acid, polymethacrylic acid, and copolymers thereof. The water-soluble polysaccharide may be a synthesized or natural substance and is preferably at least one selected from the group consisting of cellulose, carboxymethyl cellulose, methyl cellulose, pectin, gum arabic, alginic acid, and xanthan gum. Among them, cellulose is preferred because of easy availability. Cellulose may be in the form of cellulose nanofibers.

The absorbent according to the embodiment contains water as a solvent and hence is an aqueous solution in which the aforementioned amine compound and water-soluble polymer compound are dissolved or dispersed.

The acidic gas absorbent contains the amine compound in an amount of preferably 3 to 80 wt %, more preferably 5 to 75 wt % based on the total mass of the absorbent.

It is generally preferred for the amine concentration to be high in view of energy consumption, plant scale and processing efficiency. That is because carbon dioxide is absorbed and desorbed in large amounts per unit volume and further the rates thereof are high when the amine compound is contained in a high concentration.

However, if the amine concentration is too high, the absorbent may have increased viscosity. On the other hand, if the amine compound is contained in an amount of 5 wt % or more, carbon dioxide can be absorbed in a sufficient amount at a favorable rate to realize excellent processing efficiency.

When adopted for recovering CO$_2$, the acidic gas absorbent containing the amine compound in an amount within the above range is not only capable of absorbing CO$_2$ in a large amount at a high rate but also capable of desorbing CO$_2$ in a large amount at a high rate. Accordingly, the absorbent has the advantage of efficiently recovering carbon dioxide.

The acidic gas absorbent contains the water-soluble polymer compound in an amount of preferably 0.001 to 1 wt % based on the total mass of the absorbent. The more the absorbent contains the polymer compound, the more the diffusibility is improved. However, if the polymer compound is contained too much, the absorbent may have such a high viscosity as to be difficult to handle.

There are no particular restrictions on the viscosity of the acidic gas absorbent, but it is preferably 1 to 200 mPa·s, more preferably 10 to 100 mPa·s at 25° C. The water-soluble polymer is contained for the purpose of exhibiting sufficient performance, and hence the acidic gas absorbent has a high viscosity in general. However, if the viscosity is too high, the absorbent has poor handling properties.

The viscosity of the absorbent can be measured by means of VISCOMETER DV-II+Pro ([trademark], manufactured by BROOKFIELD).

The acidic gas absorbent according to the embodiment contains the above amine compound and the above water-soluble polymer compound, and it can further contain other optional ingredients according to necessity.

Examples of the optional ingredients include: oxidation inhibitors, pH adjusters, defoaming agents, and anticorrosive agents.

Preferred examples of the oxidation inhibitors include: dibutylhydroxytoluene (BHT), butylhydroxyanisole (BHA), sodium erythorbate, sodium nitrite, sulfur dioxide, 2-mercaptoimidazole and 2-mercaptobenzimidazole. When the oxidation inhibitor is incorporated, the amount thereof is preferably 0.01 to 1 wt %, more preferably 0.1 to 0.5 wt % (provided that the whole amount of the absorbent is regarded as 100 wt %). The oxidation inhibitor can inhibit deterioration of the absorbent to extend the working lifetime thereof.

Preferred examples of the defoaming agents include: silicone defoaming agents and organic defoaming agents. When the defoaming agent is incorporated, the amount thereof is preferably 0.00001 to 0.001 wt %, more preferably 0.0005 to 0.001 wt % (provided that the whole amount of the absorbent is regarded as 100 wt %). The defoaming agent can inhibit foaming of the absorbent so as to prevent decrease of absorption and desorption efficiencies and to keep the absorbent from degradation in fluidity and in circulation efficiency.

Preferred examples of the anticorrosive agents include: phosphate esters, tolyltriazoles, and benzotriazoles. When the anticorrosive agent is incorporated, the amount thereof is preferably 0.00003 to 0.0008 wt %, more preferably 0.00005 to 0.005 wt % (provided that the whole amount of the absorbent is regarded as 100 wt %). The anticorrosive agent prevents corrosion of the plant facilities to extend the working lifetime thereof.

As described above, the acidic gas absorbent of the present embodiment can increase the amount of absorbed acidic gas such as carbon dioxide. In addition, it is only a small amount of energy that is necessary for recovering the acidic gas. Further, since the absorbent contains an specific amine compound, the diffusibility thereof is kept at such a low level as to prevent the compound from leaking out of the reaction apparatus. Further, the absorbent has not only high reactivity with acidic gases (such as, carbon dioxide ($CO_2$), hydrogen sulfide ($H_2S$) and carbonyl sulfide (COS)) but also excellent solubility in water, and hence is hardly deposited when absorbing those acidic gases The acidic gas absorbent containing the compound according to the embodiment is remarkably improved in absorption capacity of acidic gases (particularly, carbon dioxide) per unit mol and in absorption capacity and rate of acidic gases per unit volume of the absorbent. Further, the absorbent of the embodiment also can reduce the amounts of amines emitted from the absorption tower and the regeneration tower.

<Acidic Gas Removal Method>

In the acidic gas removal method according to the embodiment, a gas containing an acidic gas is brought into contact with the above acidic gas absorbent so as to remove the acidic gas from the acidic gas-containing gas.

The acidic gas removal method of the embodiment basically comprises: a step (absorption step) in which the aforementioned absorbent of the embodiment is made to absorb an acidic gas; and another step in which the acidic gas-holding absorbent of the embodiment is made to release the absorbed acidic gas.

Specifically, the acidic gas removal method according the embodiment essentially comprises: a step (acidic gas absorption step) in which an acidic gas-containing gas (e.g., exhaust gas or the like) is brought into contact with the acidic gas absorbent so that the acidic gas is absorbed in the absorbent; and another step (acidic gas separation step) in which the acidic gas-holding absorbent obtained in the above acidic gas absorption step is heated to desorb and remove the acidic gas from the absorbent.

There are no particular restrictions on how an acidic gas-containing gas is brought into contact with an aqueous solution containing the above acidic gas absorbent. For example, the acidic gas-containing gas may be bubbled and thereby absorbed in the absorbent; the absorbent may be sprayed in the form of mist into a stream of the acidic gas-containing gas (spray method); or otherwise the acidic gas-containing gas may be brought into countercurrent contact with the absorbent in an absorption unit filled with a ceramic or metal mesh filler.

When the aqueous absorbent solution is made to absorb the acidic gas-containing gas, the temperature of the absorbent is preferably room temperature to 60° C. or less, more preferably 50° C. or less, further preferably 20 to 45° C. The lower the treating temperature is, the more the acidic gas is absorbed. However, the lower limit of the treating temperature can be determined according to the gas temperature in the process and to the heat recovery target or the like. The pressure in the step of absorbing the acidic gas is normally near atmospheric pressure. Although the pressure can be increased to enhance the absorption performance, the process is preferably carried out at atmospheric pressure so as to save energy consumption used for compression.

In order to separate the acidic gas from the acidic gas-holding absorbent and to recover pure or highly concentrated carbon dioxide, the absorbent may be heated while the liquid interface thereof is spread in a plate column, in a spray tower or in a regeneration tower filled with a ceramic or metal mesh filler.

When the acidic gas is desorbed, the acidic gas absorbent is kept at a temperature of normally 70° C. or more, preferably 80° C. or more, further preferably 90 to 120° C. The higher the temperature is, the more the acidic gas is desorbed. However, in order to raise the temperature, it is necessary to increase energy for heating the absorbent. Accordingly, the temperature can be determined according to the gas temperature in the process and to the heat recovery target or the like. The pressure in the step of desorbing the acidic gas can be normally set at about 1 to 3 atm.

After the acidic gas is desorbed, the acidic gas absorbent can be recycled and reused in the acidic gas absorption step. In addition, heat generated in the step of absorbing the acidic gas is generally cooled in a heat exchanger and used for preheating the aqueous solution supplied to the regeneration unit where the solution is processed for recycling.

The thus recovered acidic gas normally has such a high purity as 95 to 99 vol %. This pure or highly concentrated acidic gas can be utilized as a material for synthesizing chemicals and/or polymers or as a coolant for food freezing. Further, the recovered gas also can be subjected to segregated storage in the ground or the like by use of technologies under development.

Among the above steps, the most energy is consumed in the step where the acidic gas is desorbed from the acidic gas absorbent to regenerate the absorbent. Specifically, this step often consumes about 50 to 80% of the energy used in all the steps. Accordingly, if it is realized to reduce energy consumption in the step of regenerating the absorbent, it becomes possible to lower the cost for absorbing and desorbing the acidic gas and, as a result, the acidic gas can be removed from exhaust fumes efficiently and economically advantageously.

The acidic gas absorbent according to the embodiment can reduce energy necessary for desorbing the acidic gas (namely, for the regeneration step), and therefore the $CO_2$ absorption and desorption steps can be carried out efficiently and economically advantageously.

<Acidic Gas Removal Apparatus>

The acidic gas removal apparatus according to the embodiment comprises:

an absorption unit in which a gas containing an acidic gas is brought into contact with the aforementioned first or second acidic gas absorbent, so that the absorbent absorbs the acidic gas to remove it from the acidic gas-containing gas; and a regeneration unit in which the absorbent holding the acidic gas is made to desorb the acidic gas so as to be regenerated;

so that the absorbent regenerated in the regeneration unit is reused in the absorption unit.

FIG. 1 schematically shows the acidic gas removal apparatus according to the embodiment.

The acidic gas removal apparatus 1 comprises: an absorption unit 2 in which a gas containing an acidic gas (e.g., exhaust gas) is brought into contact with the acidic gas absorbent, so that the absorbent absorbs the acidic gas to remove it from the acidic gas-containing gas; and a regeneration unit 3 in which the absorbent holding the acidic gas is made to desorb the acidic gas so as to be regenerated.

In the following description, the explanation is given in case examples where the acidic gas is carbon dioxide.

As shown in FIG. 1, a discharge gas containing $CO_2$, such as, a combustion exhaust gas emitted from a thermal power plant or the like, is introduced through a gas inlet 4 into the lower part of the absorption unit 2. The discharge gas is confined in the absorption unit 2 and brought into contact with an acidic gas absorbent supplied from an absorbent inlet 5 provided on the upper part of the unit. As the acidic gas absorbent, the aforementioned absorbent of the embodiment is employed.

The acidic gas absorbent may contain not only the aforementioned amine compound and the solvent such as water, but also other compounds, such as, nitrogen-containing compounds that improve $CO_2$ absorption performance, antioxidants and pH adjusters, in desirable amounts.

In the way described above, as the result of contact with the acidic gas absorbent, carbon dioxide is absorbed in the absorbent and thereby removed from the discharge gas. After treated to remove carbon dioxide, the discharge gas is emitted through a gas outlet 6 from the absorption unit 2.

The $CO_2$-holding absorbent is then sent by a rich liquid pump 8 to a heat exchanger 7 and then to the regeneration unit 3. In the regeneration unit 3, while the absorbent is moved down from the upper part to the lower part, the acidic gas is desorbed from the absorbent and thereby the absorbent is regenerated.

The absorbent regenerated in the regeneration unit 3 is sent by a lean liquid pump 9 to the heat exchanger 7 and an absorbent cooler 10, and then returned into the absorption unit 2 through the absorbent inlet 5.

On the other hand, at the upper part of the regeneration unit 3, the acidic gas released from the absorbent is brought into contact with reflux water supplied from a reflux drum 11. The water is then transferred out of the regeneration unit 3.

The $CO_2$-containing reflux water is cooled with a reflux condenser 12, and thereafter separated in the reflux drum 11 into water and a liquid component condensed from water vapor accompanying $CO_2$. The liquid component is sent through an acidic gas recovering line 13 for the step of recovering the acidic gas. Meanwhile, the reflux water separated from the acidic gas is sent into the regeneration unit 3.

The acidic gas removal apparatus 1 thus employs the acidic gas absorbent excellent in acidic gas absorption and desorption performance, and thereby makes it possible to absorb and remove acidic gases efficiently.

EXAMPLES

Example 1

In water, methyldiethanolamine (vapor pressure: 0.03 Pa at 20° C.) and carboxymethyl cellulose were dissolved so that the concentrations thereof might be 45 wt % and 0.07 wt %, respectively, to prepare an aqueous solution (which is hereinafter referred to as "absorbent"). This absorbent was found to have a viscosity of 25 mPa·s.

The absorbent was bubbled with 1% $CO_2$ at 40° C. for 2 hours, and the diffused amine compound was collected to evaluate the diffusibility. As a result, the diffusibility was found to be about 1.2 ppm (v/v).

The absorbent was placed in a test tube, heated at 40° C., and bubbled at a flow rate of 500 mL/minute with a gas mixture containing 10 vol % of carbon dioxide ($CO_2$) and 90 vol % of nitrogen ($N_2$). At the mouth of the test tube, the $CO_2$ concentration was then measured to evaluate the absorption performance by means of an infrared gas analyzer. As a result, the amount of absorbed carbon dioxide was found to be 0.1 mol per 1 mol of the amine compound in the absorbent.

Example 2

The procedure of Example 1 was repeated except that the concentration of carboxymethyl cellulose was changed into 0.05 wt %, and the thus prepared aqueous solution was evaluated in the same manner.

As a result, the diffusibility and the amount of absorbed carbon dioxide were found to be 1.0 ppm (v/v) and 0.1 mol per 1 mol of the amine compound, respectively.

Comparative Example 1

The procedure of Example 1 was repeated except that carboxymethyl cellulose was not used, and the thus prepared aqueous solution was evaluated in the same manner.

As a result, the diffusibility and the amount of absorbed carbon dioxide were found to be 2.7 ppm (v/v) and 0.1 mol per 1 mol of the amine compound, respectively.

From the results of Examples 1, 2 and Comparative example 1, it was revealed that an absorbent having poor diffusibility can be improved in the diffusibility without impairing the $CO_2$-absorption performance by incorporating a water-soluble polymer material.

Example 3

In water, methyldiethanolamine and carboxymethyl cellulose were dissolved so that the concentrations thereof might be 30 wt % and 0.07 wt %, respectively, to prepare an aqueous solution (which is hereinafter referred to as "absorbent"). This absorbent was found to have a viscosity of 10 mPa·s.

The absorbent was bubbled with 1% $CO_2$ at 40° C. for 2 hours, and the diffused amine compound was collected to evaluate the diffusibility. As a result, the diffusibility was found to be about 1.15 ppm (v/v).

Comparative Example 2

In water, methyldiethanolamine was dissolved so that the concentration thereof might be 30 wt %, to prepare an aqueous solution (which is hereinafter referred to as "absorbent"). This absorbent was found to have a viscosity of 15 mPa·s.

The absorbent was bubbled with 1% $CO_2$ at 40° C. for 2 hours, and the diffused amine compound was collected to evaluate the diffusibility. As a result, the diffusibility was found to be about 2 ppm (v/v).

Comparative Example 3

In water, piperazine (vapor pressure: 21 Pa at 20° C.) was dissolved so that the concentration thereof might be 15 wt %, to prepare an aqueous solution (which is hereinafter referred to as "absorbent"). This absorbent was found to have a viscosity of 7 mPa·s.

The absorbent was bubbled with 1% $CO_2$ at 40° C. for 2 hours, and the diffused amine compound was collected to evaluate the diffusibility. As a result, the diffusibility was found to be about 2.0 ppm (v/v).

Comparative Example 4

In water, piperazine and carboxymethyl cellulose were dissolved so that the concentrations thereof might be 15 wt % and 0.07 wt %, respectively, to prepare an aqueous solution (which is hereinafter referred to as "absorbent"). This absorbent was found to have a viscosity of 10 mPa·s.

The absorbent was bubbled with 1% $CO_2$ at 40° C. for 2 hours, and the diffused amine compound was collected to evaluate the diffusibility. As a result, the diffusibility was found to be about 2.1 ppm (v/v).

It can be thus realized to reduce diffusion of the amine compound by use of at least one of the embodiments, namely, the acidic gas absorbent, the acidic gas removal method and the acidic gas removal apparatus.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fail within the scope and sprit of the invention.

The invention claimed is:

1. An acidic gas absorbent comprising:
   an aminoalcohol having a vapor pressure of 0.005 to 5 Pa at 20° C.;
   a water-soluble polymer compound which has a mass-average molecular weight of 900 to 20000) and which does not contain a functional group having a pKa value greater than 7 except for hydroxy; and
   water,
   wherein
   said water-soluble polymer compound is at least one selected from the group consisting of carboxy vinyl polymer, alkali metal salts of carboxy vinyl polymer, polyvinyl alcohol, cellulose, carboxymethyl cellulose, methyl cellulose, alginic acid, vinyl polymer, and polysaccharide, and
   said absorbent comprises the aminoalcohol in an amount of 5 to 80 wt % based on a total mass of the absorbent.

2. The acidic gas absorbent according to claim 1, wherein the aminoalcohol is methyldiethanolamine.

3. The acidic gas absorbent according to claim 1, which has a viscosity of 10 to 200 mPa·s at 20° C. before brought into contact with an acidic gas.

4. The acidic gas absorbent according to claim 1, which contains said water-soluble polymer compound in an amount of 0.001 to 1 wt % provided that the whole amount of the absorbent is regarded as 100 wt %.

5. The acidic gas absorbent according to claim 1, further comprising at least one additive agent selected from the group consisting of oxidation inhibitors, pH adjusters, defoaming agents, and anticorrosive agents.

6. An acidic gas removal method, comprising: contacting a gas containing an acidic gas with the acidic gas absorbent according to claim 1 so as to remove the acidic gas from the acidic gas-containing gas.

7. An acidic gas removal apparatus comprising:
   an absorption unit in which a gas containing an acidic gas is brought into contact with the acidic gas absorbent according to claim 1, so that the absorbent absorbs the acidic gas to remove it from the acidic gas-containing gas; and
   a regeneration unit in which the absorbent holding the acidic gas is made to desorb the acidic gas so as to be regenerated;
   so that the absorbent regenerated in the regeneration unit is reused in the absorption unit.

* * * * *